Aug. 23, 1927.
L. C. BUFFINGTON
1,639,879
COMBINED END GATE AND RAMP
Filed April 1, 1926    3 Sheets-Sheet 1
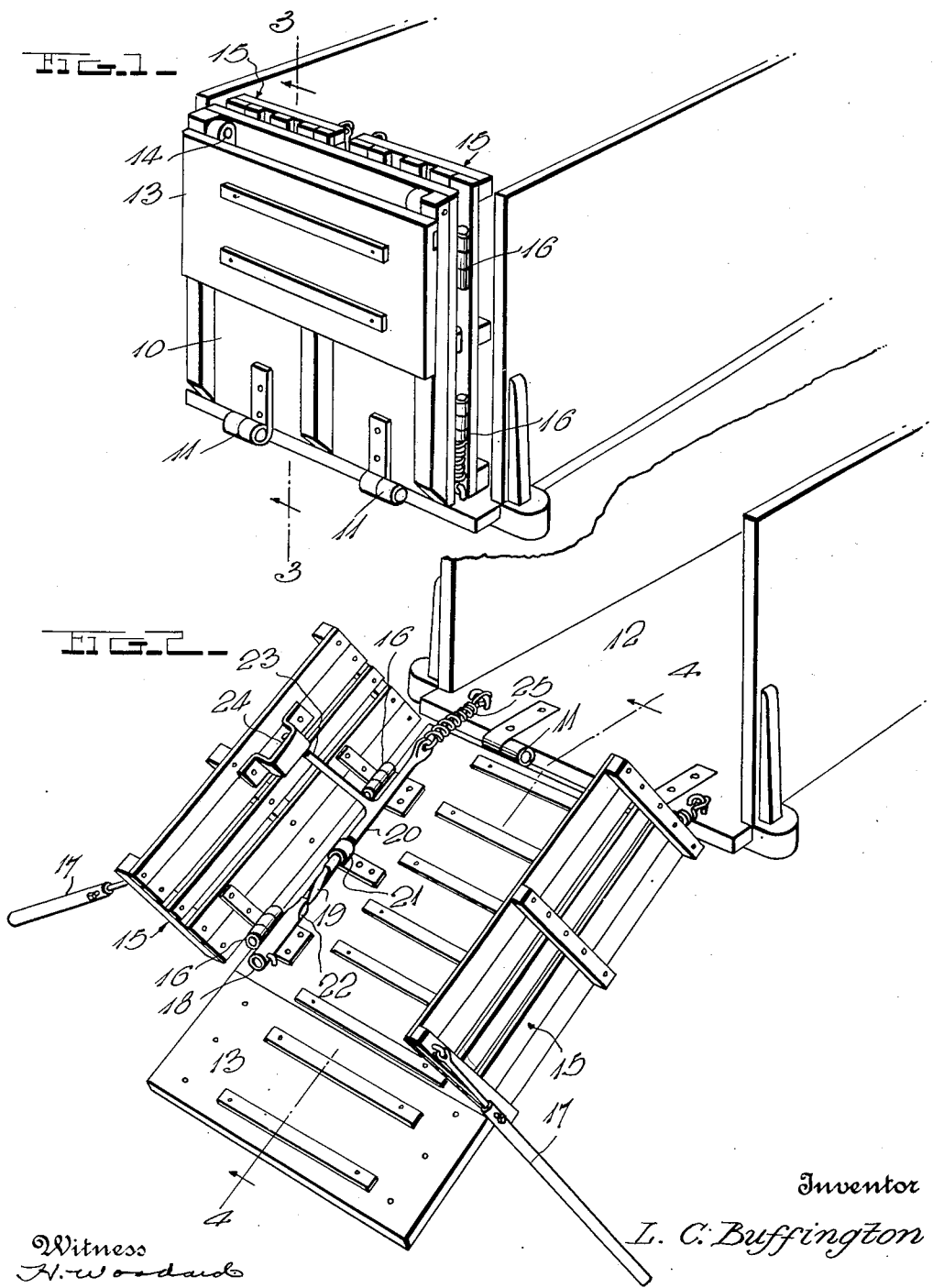
Inventor
L. C. Buffington

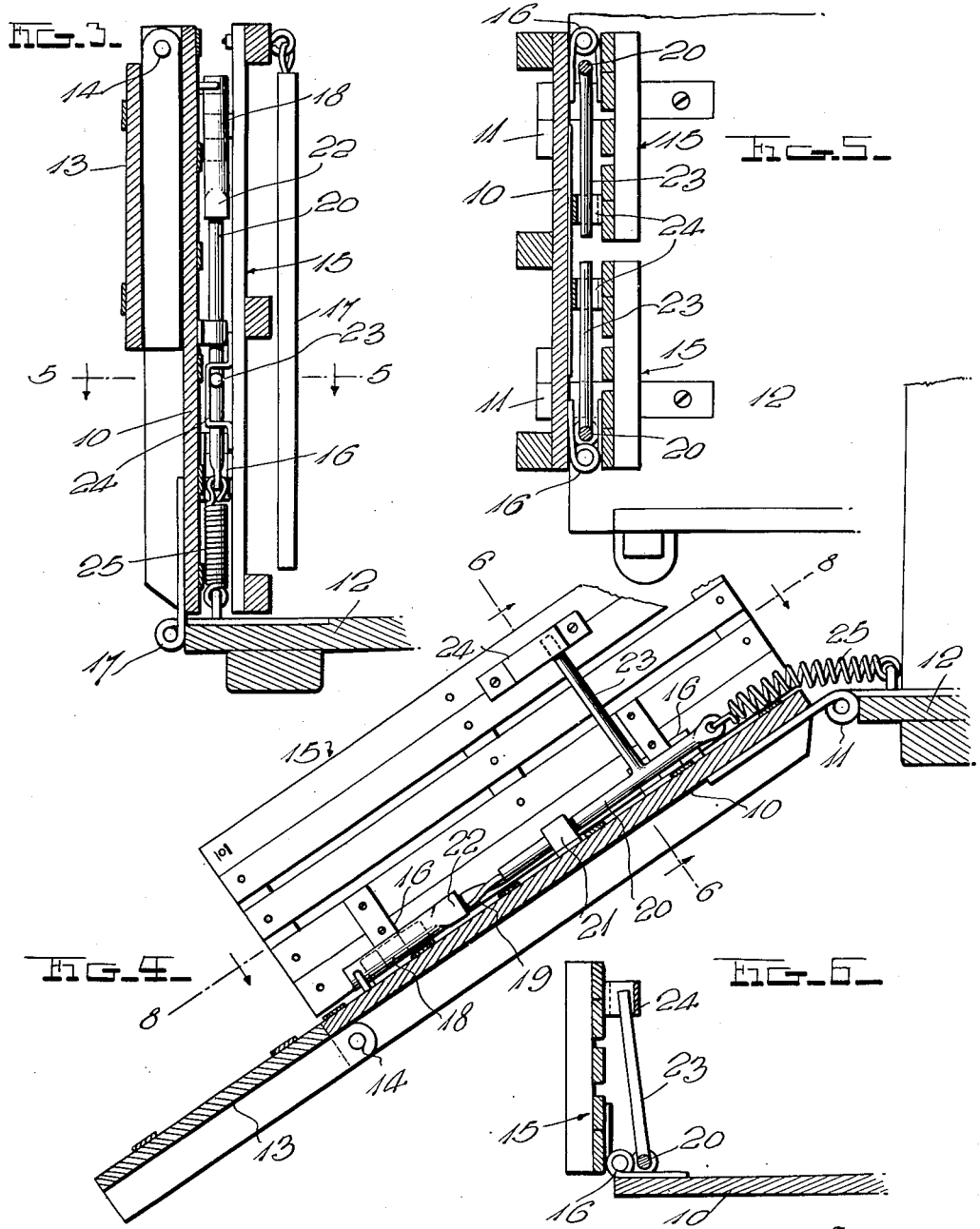

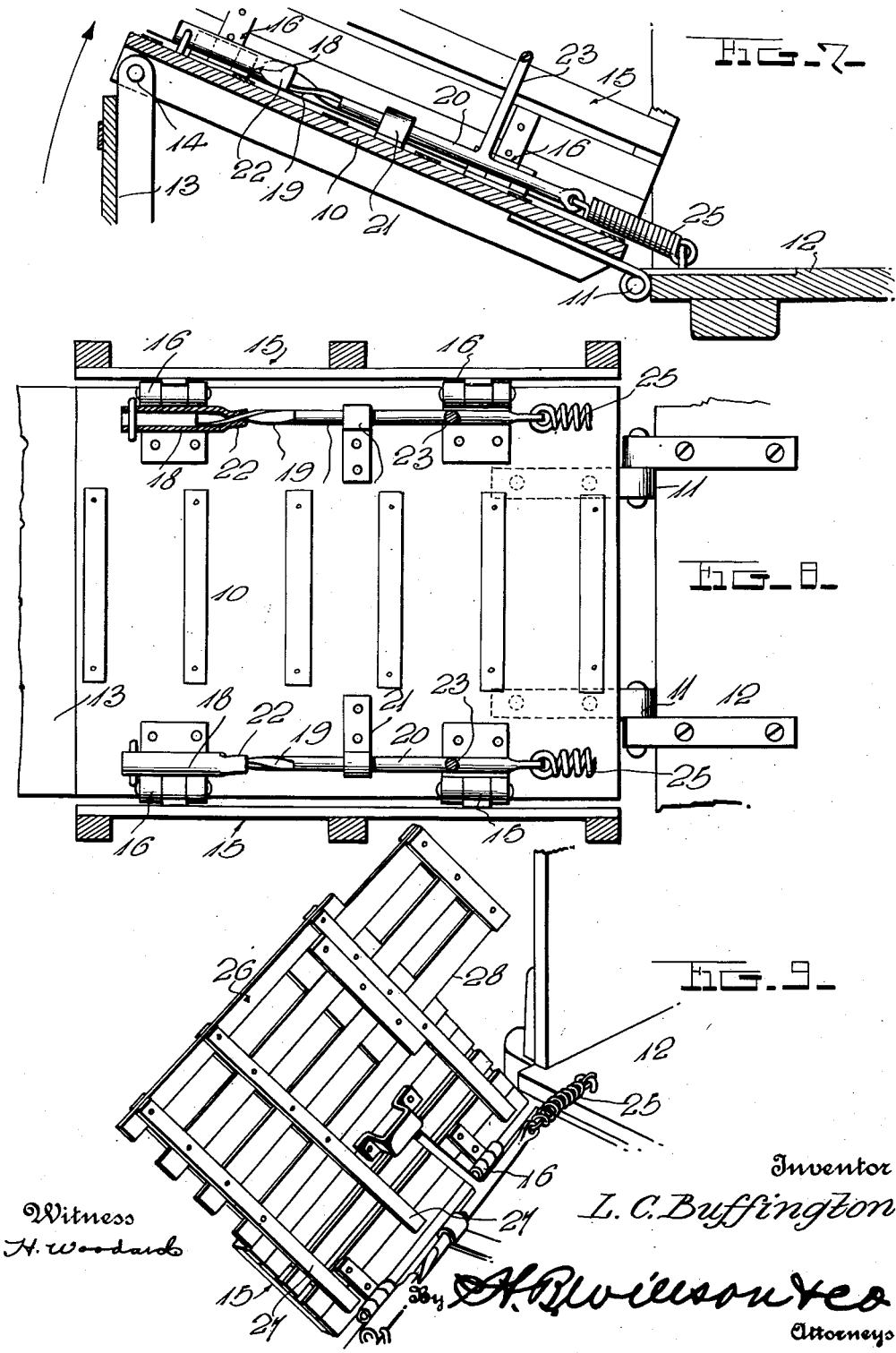

Patented Aug. 23, 1927.

1,639,879

UNITED STATES PATENT OFFICE.

LEONARD C. BUFFINGTON, OF GOLDEN CITY, MISSOURI.

COMBINED END GATE AND RAMP.

Application filed April 1, 1926. Serial No. 99,101.

The invention relates to improvements in ramps for loading stock into or unloading it from wagon or truck beds, and has reference more particularly to devices of this character in which the ramp when closed forms an end gate for the body or bed.

In carrying out my invention, I provide the ramp with a pair of hingedly mounted side walls and preferably with an extension which is also hingedly mounted, the relation of parts being such that the side walls may fold against one side of the ramp and the extension against the other side thereof, when the device is to be used only as a tail gate.

Another object of the invention is to provide novel means whereby the side walls of the ramp are automatically swung inwardly upon the latter when said ramp is upwardly swung to tail-gate-forming position, said means acting also to automatically raise the side walls to operative position, when the ramp is swung downwardly for loading or unloading purposes.

A still further aim is to provide novel extensions for the side walls of the ramp to be used when loading or unloading cattle or other large stock, overcoming any possibility of the stock endeavoring to leap over said walls or pass between their upper ends and the bed of the wagon or truck.

With the foregoing in view, the invention resides in the novel subject matter hereinafter described and claimed, the description being supplemented by the accompanying drawings.

Fig. 1 is a perspective view showing the invention in tail-gate-forming position.

Fig. 2 is a perspective view illustrating the device swung downwardly to operative position for loading or unloading purposes.

Fig. 3 is a vertical sectional view as indicated by line 3—3 of Fig. 1.

Fig. 4 is a longitudinal section on the plane of line 4—4 of Fig. 2.

Fig. 5 is a horizontal section as indicated by line 5—5 of Fig. 3.

Fig. 6 is a detail transverse section on the plane of line 6—6 of Fig. 4.

Fig. 7 is a longitudinal sectional view illustrating the ramp in a partially raised position.

Fig. 8 is a horizontal section on line 8—8 of Fig. 4.

Fig. 9 is a perspective view showing one of the side wall extensions.

The combined ramp and end gate constituting this invention comprises a ramp body 10 having hinged side walls 15. The body 10, constructed in any desired manner and provided with hinges 11 by means of which it may be connected with a wagon or truck bed 12. These hinges are shown directly connected to the bed 12, but in some instances, they might be secured to a suitable member detachably connected with the bed, so that the ramp could be disconnected from the bed at any desired time. Detachability could also be attained by removably bolting the bed-carried leaves of the hinges 11, to the bed.

An extension 13 is provided for the lower end of the ramp body 10, said extension being pivoted to the ramp as indicated at 14, so that it may swing against the outer side of said ramp body when the latter is upwardly folded to the position shown in Figs. 1, 3 and 5. The side walls 15 are preferably of slatted construction and hinged at 16 to the ramp body 10, so that they may fold inwardly upon the sides of the latter remote from the extension 13, when the device is upwardly folded to the tail-gate-forming position of Figs. 1, 3 and 5. Extensible and retractible braces 17 are preferably connected loosely with the side walls 15, so that the stock cannot outwardly crowd and break said walls loose from the ramp 10.

Provision is made for automatically swinging the side walls 15 inwardly upon the ramp body 10 when the latter is swung upwardly and for automatically elevating said walls 15 to operative position, when the ramp is swung downwardly for loading or unloading purposes. This means is identical for each of the walls 15 and a description in connection with one will therefore suffice.

A sleeve 18 is secured to the ramp body 10 in parallel relation with and adjacent the hinge line of the wall 15, said sleeve slidably receiving a helically pitched end 19 on a longitudinal rod 20 which is co-axial with the sleeve, said rod being slidably and rotatably received in a suitable bearing 21 secured to the ramp body 10. The helically pitched end 19 of the rod 20 engages a guide or nut formation 22 which is preferably at one end of the sleeve 18 so that endwise movement of said rod will cause it to rotate. This rod is provided with a lateral arm 23 disposed at the inner side of the wall 15 and suitably connected with the latter, for instance, by loose reception in a stirrup 24 which is secured to said wall. The end of the rod 20, remote from the sleeve 18, is connected with the bed 12, by a coiled tension spring 25 which is self-contracting until all of its convolutions contact with each other as in Fig. 7, in the preferred form of construction. When the spring reaches this condition, upon upward swinging of the ramp body 10 and associated parts, said spring will thrust upon the rod 20 as will be clear from Fig. 7, thus forcing this rod further into the sleeve 18 and causing the co-acting means 19—22, to rotate the rod, thereby forcing its arm 23 to swing the side wall 15 inwardly against the ramp body 10, as the latter is upwardly swung. When this ramp is again swung downwardly from the position of Fig. 1 to that of Fig. 2, the spring 25 pulls upon the rod 20 and moves the latter partially out of the sleeve 18, and when this movement takes place, the co-acting means 19—22, cause said rod to rotate in such a direction as to force its arm 23 to swing the side wall 15 upwardly to operative position. It will thus be seen that unique provision has been made for automatically folding the side walls 15 inwardly upon the body of the ramp when the latter is upwardly swung to tail-gate-forming position, and for automatically extending said side walls in position for use, when the ramp is downwardly swung. A device is thus provided which is exceptionally advantageous, and requires only an infinitesimal amount of time to either condition it for loading or unloading, or to dispose it at tail-gate-forming position. Obviously, any desired means may be employed to hold the device in this last named position.

When loading or unloading cattle or other large stock, I prefer to employ upward extensions 26 for the side walls 15, said extensions preferably having downwardly projecting arms 27 which straddle said walls to releasably connect the extensions therewith. The upper, inner portions of these extensions 26 are preferably each provided with a slidable extension 28 which may be projected toward the wagon bed as shown in Fig. 9, thereby closing gaps which would otherwise exist and preventing the stock from endeavoring to pass between the walls 15 and the wagon bed, and it will be seen that the upward extensions 26 prevent the stock from attempting to jump over the walls 15.

As excellent results are obtainable from the general construction shown and described, it may be followed if desired. However, within the scope of the invention as claimed, variations may be made.

I claim:—

1. A loading and unloading attachment comprising a ramp including a body, means for hingedly connecting the upper end of said body to the bed of a truck or wagon to permit said body to be swung upwardly to a tail-gate forming position, a pair of side walls hingedly connected to said body, means for automatically swinging said side walls inwardly towards said body when the latter is swung upwardly and outwardly to operative position when the ramp is swung downwardly, said means comprising longitudinally movable and rotatable members mounted on said ramp body and having connection with its side walls, and means for turning said rotatable members when longitudinal movement is imparted thereto whereby the side walls of the ramp are raised or lowered according to the direction of turning of said rotatable members.

2. A loading and unloading attachment comprising a ramp, means for hingedly connecting the upper end of said ramp to the bed of a truck or wagon and permitting upward swinging of said ramp to a tail-gate-forming position, a pair of side walls for the ramp hingedly connected therewith, raising and lowering means for said side walls including longitudinally movable and rotatably mounted members having connection with the side walls, means for turning the movable members when longitudinal movement is imparted to them, and connecting means between the movable members and the wagon bed for effecting longitudinal movement of said movable members when the ramp is vertically moved.

3. A structure as specified in claim 2; the connecting means between said movable members and said side walls comprising rigid arms projecting laterally from said movable members, and stirrups secured to the walls and loosely receiving said arms.

4. A loading and unloading attachment comprising a ramp, means for hingedly connecting the upper end of said ramp to the bed of a wagon or truck, a pair of side members for the ramp hingedly connected therewith, rods parallel with said side members and mounted for both longitudinal and rotary movement upon the ramp, said rods having helical portions, nut members secured to the ramp and engaging said helical portions to cause rotation of the rods when the latter are longitudinally moved, coiled tension springs for connecting said rods with the truck or wagon bed to effect longitudinal movement of the rods when the ramp is vertically moved, and connections between said rods and said side walls for swinging the latter inwardly or outwardly according to the direction of rotation of the rods.

5. A loading and unloading attachment comprising a ramp, means for hingedly connecting the upper end of said ramp to the bed of a wagon or truck, a pair of side members for the ramp hingedly connected therewith, rods parallel with said side members and mounted for both longitudinal and rotary movement upon the ramp, said rods having helical portions, nut members secured to the ramp and engaging said helical portions to cause rotation of the rods when the latter are longitudinally moved, coiled tension springs for connecting said rods with the truck or wagon bed to effect longitudinal movement of the rods when the ramp is vertically moved, lateral arms projecting from said rods adjacent said side walls, and side loose connections between said arms and walls, said arms and connections being operable to transmit the turning movement of the rods to the side walls.

6. In combination with a ramp for connection with a wagon or truck bed, said ramp having side walls, an upward extension for each of said side walls straddling said walls to detachably mount the extension thereon, an inward extension for each of said detachable extensions, each inward extension being slidably mounted upon the detachable upward extension for projection toward the truck or wagon bed to close the gap between the bed and the side wall extension when the ramp is lowered.

In testimony whereof I have hereunto affixed my signature.

LEONARD C. BUFFINGTON.